(12) United States Patent
Valentini

(10) Patent No.: US 7,833,337 B2
(45) Date of Patent: Nov. 16, 2010

(54) AQUEOUS INKJET INK COMPRISING A BLEED CONTROL AGENT

(75) Inventor: Jose Esteban Valentini, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/481,815

(22) Filed: Jun. 10, 2009

(65) Prior Publication Data

US 2009/0308281 A1 Dec. 17, 2009

Related U.S. Application Data

(60) Provisional application No. 61/131,830, filed on Jun. 12, 2008.

(51) Int. Cl.
*C09D 11/02* (2006.01)

(52) U.S. Cl. .................................................. 106/31.86
(58) Field of Classification Search ............... 106/31.86
See application file for complete search history.

(56) References Cited

U.S. PATENT DOCUMENTS 6,280,513 B1 * 8/2001 Osumi et al. ............... 106/31.6
7,141,353 B2 * 11/2006 Oshima .................... 430/281.1

* cited by examiner

*Primary Examiner*—Jerry Lorengo
*Assistant Examiner*—Veronica Faison Gee
(74) *Attorney, Agent, or Firm*—Simon L. Xu; Angela J. Grayson

(57) ABSTRACT

The invention provides an ink for inkjet printing, comprising a self-dispersing pigment colorant and a bleed control agent selected from the group consisting of catechol, 4-methylcatechol and any combination thereof. The ink advantageously exhibits reduced intercolor bleed when printed, for example, on plain paper.

14 Claims, No Drawings

AQUEOUS INKJET INK COMPRISING A BLEED CONTROL AGENT

CROSS-REFERENCE TO RELATED APPLICATION

This application claims priority under 35 U.S.C. §119 from U.S. Provisional Application Ser. No. 61/131,830, filed Jun. 12, 2008.

BACKGROUND OF THE INVENTION

This invention pertains to an aqueous inkjet ink, in particular to an aqueous inkjet ink comprising an aqueous vehicle, a colorant and a bleed control agent.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY).

Bleed of one color into another is a typical problem in ink jet printing because inks have relatively low viscosity and tend to spread especially for inkjet printers having capability of printing three or four primary colors in a simultaneous (or near simultaneous) fashion. Such bleed of one printing liquid into an adjacent printing liquid results in production of indistinct images with a poor degree of resolution.

Various methods have been proposed to prevent bleed of adjacent printing liquids. One method is to apply the two printing liquids at a distance from one another so that no intermingling or mixing of the printing liquids can occur. However, this method produces images of poor resolution. Another method involves a delay in applying the second printing liquid until the first printing liquid is completely dry. This method is disadvantageous due to its inefficiencies. Yet another approach to control bleed is to increase the rate of penetration of the printing liquid into the substrate, but this causes a reduction of optical density.

U.S. Pat. No. 6,280,513 discloses an ink comprising a self-dispersing pigment and certain salts to improve optical density and bleed properties. The ink may further comprise an antioxidant including catechol. However, it does not describe the combination of a self-dispersing pigment and catechol.

While the use of inorganic or organic salts in one or more inks of the ink set has provided improved bleed property in inkjet printing, a need still exists for improved inkjet ink formulations that provide good print quality without the drawbacks of having high concentration of salts in inks. The present invention satisfies this need by providing compositions having improved optical density and bleed property.

SUMMARY OF THE INVENTION

An embodiment of the invention provides an inkjet ink comprising an aqueous vehicle, a self-dispersing pigment and a bleed control agent, wherein said bleed control agent is selected from the group consisting of catechol and 4-methylcatechol and any combination thereof, and said self-dispersing pigment comprising carboxylate dispersibility-imparting groups directly bonded to the surface of the pigment.

Another embodiment provides the self-dispersing pigment comprising a self-dispersing carbon black pigment.

Another embodiment provides that the self-dispersing pigment has a degree of functionalization.

Another embodiment provides that the self-dispersing pigment has a degree of functionalization of less than about 3 μmol/m².

Another embodiment provides the bleed control agent is catechol.

Another embodiment provides the bleed control agent is 4-methylcatechol.

Another embodiment provides the amount of the bleed control agent present is greater than 2% by weight based on total weight of the ink.

A further embodiment provides an inkjet ink set comprising at least a magenta, yellow, cyan and black ink, wherein the black ink comprises an aqueous vehicle, self-dispersing carbon black pigment and a bleed control agent, wherein said bleed control agent is selected from the group consisting of catechol, 4-methylcatechol, and any combination thereof, and wherein said self-dispersing pigment comprises carboxylate dispersibility-imparting groups directly bonded to the surface of the pigment.

Yet another embodiment provides that the magenta, yellow and cyan inks in the ink set are dyes.

The magenta, yellow and cyan inks of the ink set are preferably aqueous inks, and may contain dyes, pigments or combinations thereof as the colorant. Such other inks are, in a general sense, well known to those of ordinary skill in the art.

These and other features and advantages of the present invention will be more readily understood by those of ordinary skill in the art from a reading of the following Detailed Description. Certain features of the invention which are, for clarity, described above and below as a separate embodiments, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, reference to enhanced or improved "print quality" means some aspect of optical density, gloss, and Distinctness of Image (DOI) of the printed images and fastness (resistance to ink removal from the printed image) is increased, including, for example, rub fastness (finger rub), water fastness (water drop) and smear fastness (highlighter pen stroke).

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "Gloss" means observation of reflected light from a printed surface, normally the printed substrate is glossy paper As used herein, the term "degree of functionalization" refers to the amount of hydrophilic groups present on the surface of the SDP per unit surface area, measured in accordance with the method described further herein.

As used herein, the term "aqueous vehicle" refers to water or a mixture of water and at least one water-soluble organic solvent (co-solvent).

As used herein, the term "ionizable groups" means potentially ionic groups.

As used herein, the term "substantially" means being of considerable degree, almost all.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means dethylenetriamine-N,N,N',N",N"-pentaacetic acid.

As used herein, the term "GEDTA" means glycoletherdiamine-N,N,N',N'-tetraacetic acid.

As used herein, the term "PgmBE" means propylene glycol mono-n-butyl ether.

As used herein, the term "DEGmBE" means diethylene glycol mono-n-butyl ether.

As used herein, the term "MPPD" means 3-(2-methoxyphenoxy)-1-2-propanediol.

As used herein, Surfynol® 104E, 440 and 465 are surfactants from Air Products (Allentown, Pa., U.S.).

As used herein, Glycereth 26 is the polyethylene glycol ether of Glycerin with an average ethoxylation value of 26.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present invention may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of about 0.01% to about 5%, and specifically from about 0.2% to about 2%, based on the total weight of the ink.

Colorant

The colorant of the present invention is a self-dispersing (or self-dispersible) pigment. The term self-dispersing pigment (or "SDP") refers to pigment particles whose surface has been chemically modified with hydrophilic, dispersibility-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

The SDP specified in the present invention comprises carboxylate dispersibility-imparting groups which are directly bonded to the pigment surface.

Small colorant particles should be used for maximum color strength and good jetting. The particle size may generally be in the range of from about 0.005 microns to about 15 microns; more specifically, in the range of from about 0.005 to about 1 micron, more specifically from about 0.005 to about 0.5 micron, and even more specifically, in the range of from about 0.01 to about 0.3 micron.

The SDPs may be black, such as those based on carbon black, or may be colored pigments such as those based on the American Association of Textile Chemists and Colorists Color Index pigments such as Pigment Blue PB15:3 and PB15:4 cyan, Pigment Red PR122 and PR123 magenta, and Pigment Yellow PY128 and PY74 yellow.

The SDPs of the present invention may have a degree of functionalization wherein the density of anionic groups is less than about 3.5 μmoles per square meter of pigment surface (3.5 μmol/m$^2$), and more specifically, less than about 3.0 μmol/m$^2$. Degrees of functionalization of less than about 1.8 μmol/m$^2$, and more specifically, less than about 1.5 μmol/m$^2$, are also suitable and may be preferred for certain specific types of SDPs.

The levels of pigment employed in formulated inks are those levels needed to impart the desired optical density to the printed image. Typically, pigment levels are in the range of about 0.01% to about 10% by weight, and specifically from about 1% to about 9% by weight, based on the total weight of the ink.

Bleed Control Agent and Other Additives

The amount of catechol and/or 4-methylcatechol bleed control agent present in the ink is typically at least about 0.1% by weight based on the total weight of an ink. A typical range for catechol and/or 4-methylcatechol is from 2% to 8% by weight, and more specifically from 3% to 7% by weight, based on the total weight of ink. The appropriate levels of bleed control agent can be readily determined by one of ordinary skill in the art through routine experimentation. Both catechol and 4-methylcatechol are readily available commercially, for example, from Sigma-Aldrich, St. Louis, Mo. U.S.A. Catechol has a molecular formula of $C_6H_4$-1,2-$(OH)_2$, and its Chemical Abstracts (CAS) Registry Number is 120-80-9. 4-Methylcatechol has a molecular formula of $CH_3C_6H_3$-1,2-$(OH)_2$, and its CAS Registry Number is 452-86-8.

Other ingredients, additives, may be formulated into the inkjet ink, to the extent that such other ingredients do not interfere with the stability and jetablity of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Preferred classes of polymer additives include anionic acrylic, styrene-acrylic and polyurethane polymer.

When a soluble polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A preferred ink set comprises a magenta, yellow, cyan and black ink, wherein the black ink is an ink according to the present invention comprising an aqueous vehicle, a carbon black SDP and a bleed control agent. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The instant invention is particularly advantageous for printing on plain paper, such as common electrophotographic copier paper and photo paper, glossy paper and similar papers used in inkjet printers.

EXAMPLES

Inks were prepared by stirring the indicated ingredients together and filtering the resulting mixture. Water was deionized unless otherwise stated.

Dispersion 1

Carbon black (S-160 from Degussa) was oxidized with ozone according to the process described in U.S. Pat. No. 6,852,156 to create carboxylic acid groups directly attached to the carbon black pigment surface. Potassium hydroxide was used to neutralize the treated pigment and convert the surface acid groups to the potassium salt form. The neutralized mixture was purified by an ultra-filtration to remove free acids, salts, and contaminants. It was further purified by washing repeatedly with de-ionized water until the conductivity of the mixture leveled off and remained relatively constant. After recovery, Dispersion 1 was a 20.5% by weight dispersion of self-dispersing carbon black pigment.

Optical Density

Inks were printed with a Canon PIXMA 4200 printer onto Canon Office plain paper. The coverage that an inkjet printer puts down on a substrate is usually controlled by the printer software and can be set in the printer settings. Printing was done in the selected standard print mode that targets 100% coverage. This setting for 100% coverage means that the inkjet printer is to fire enough droplets/dots to cover at least 100% of the area being printed. This usually results in dots spreading and partially overlapping with each other. The reported optical density (OD) values for areas printed at 100% coverage were measured with a Greytag Macbeth Spectrolino spectrometer manufactured by Greytag-Macbeth AG, Regensdorf, Switzerland.

Evaluation of Bleed

Three test patterns were made on the same sheet of paper. In the first pattern, a solid horizontal black line about 400 microns wide was made on a white paper without any abutting color (referred to as black on white and abbreviated as K/W). In the second pattern, a similar horizontal black line abuts, on both the upper and lower edges, a solid block of yellow color (referred to as black on yellow and abbreviated as K/Y). In the third pattern, a horizontal black line similar that in the first two patterns abuts, on both the upper and lower edges, a solid block of red (yellow plus magenta) color (referred to as black on red and abbreviated as K/R).

The edge acuity of the black line in each of the three patterns was then assessed by image analysis under a microscope. A monochrome camera coupled to a microscope captured a digital photomicrograph of the line. The borders of the upper and lower edges were determined by analysis of the threshold reflectivity values. The points in each border were used to calculate a straight line representing the least squares best fit of the line edge. For each edge, the root mean square deviation (RMSD) of the points in the border was calculated (in units of microns, p) relative to the least squares best fit straight line. Sufficient quantity and location of points were sampled on a given sheet to ensure that the analysis of line edges was statistically significant. RMSD relates to the perception of line edge acuity. A line with a small RMSD appears sharp upon visual inspection, whereas a line with a large RMSD appears "fuzzy" or "ragged". This method objectively quantitates the relative sharpness (or raggedness) of a line printed under different conditions.

The unevenness of the K/W line edge (RMSD K/W) is referred to a "feathering" as there is no abutting color. The unevenness of the K/Y line edge (RMSD K/Y) or K/R line edge (RMSD K/R) is a combination of feathering and "bleed" of the black into the yellow or red. Thus "bleed", as referred to herein, is quantitated for the K/Y line as RMSD K/Y minus RMSD K/W, and for the K/R line as RMSD K/R minus RMSD K/W. An increase in bleed is the increase in RMSD of K/Y or K/R over the RMSD of K/W.

The test patterns were printed with a Canon PIXMA 4200 printer (standard mode) on Canon Office plain paper. The black inks used to make the horizontal line are described in the Examples. The yellow and magenta inks used to make the yellow and red blocks of color were the Canon CLi-8Y and Cli-8M commercial inks made for the PIXMA 4200 printer.

The RMSD may vary greatly from one brand of paper to another. Sometimes, there is substantial variation even within the same brand from one ream of paper to another. Day to day environmental variation (e.g., temperature, humidity) can also cause variability. To minimize such variability, all tests in a given series are run on the same day with paper from the same ream and the results are averaged from five test patterns on five different sheets of paper.

Example 1

Comparative

Inks 1A and 1 B were prepared using Dispersion 1 and other ingredients according to Table 1A. Ink 1A is a comparative ink using PGmBE and DEGmBE as bleed control agent as disclosed in U.S. Pat. No. 6,004,389. Ink 1 B is a control ink without any bleed control agent.

TABLE 1A

|  | Ink 1A (Comparative) | Ink 1B (Control) |
|---|---|---|
| Ingredients |  |  |
| Dispersion 1* | 4 | 4 |
| Glycerol* | 6 | 6 |
| 1-5 Pentanediol* | 8 | 11 |
| PgmBE* | 1.4 | — |
| DEGmBE* | 1.4 | — |
| Surfynol 104E* | — | 0.047 |
| Water Added | Balance to 100% | Balance to 100% |
| Physical Properties |  |  |
| Viscosity (mPa · s) | 2.53 | 2.58 |
| pH | 6.98 | 8.97 |
| Surface Tension (mN · m$^{-1}$) | 40.84 | 41.18 |

*as % by weight based on total weight of ink

Print properties of Inks 1A and 1 B are summarized in Table 1B below. The results show that the bleed control agent (PGmBE and DEGmBE) reduces bleed relative to the control (lower K/Y and K/R values), but it also causes a significant loss of optical density.

TABLE 1B

| Print Properties | Ink 1A (Comparative) | Ink 1B (Control) |
|---|---|---|
| Optical Density | 1.32 | 1.54 |
| Bleed K/Y (μ) | 41.8 | 82.3 |
| Bleed K/R (μ) | 47.1 | 110.11 |

Example 2

Inks 2A-2D were prepared using Dispersion 1 and other ingredients according to Table 2A. Inks 2A-2C are inventive inks of the present invention incorporating various levels of bleed control agent catechol whereas Ink 2D is a control ink without the presence of any catechol.

TABLE 2A

| Ingredient | Ink 2A | Ink 2B | Ink 2C | Ink 2D (Control) |
|---|---|---|---|---|
| Dispersion 1* | 4 | 4 | 4 | 4 |
| 1,3-Propanediol* | 11 | 11 | 11 | 11 |
| Glycereth 26* | 3 | 3 | 3 | 3 |
| Catechol* | 2 | 4 | 8 | — |
| Surfynol 465* | 0.066 | 0.054 | 0.063 | 0.25 |
| Water Added | Balance to 100% | Balance to 100% | Balance to 100% | Balance to 100% |
| Physical Properties | | | | |
| Viscosity (mPa · s) | 2.27 | 2.41 | 2.58 | 2.51 |
| pH | 7.00 | 7.04 | 7.11 | 7.09 |
| Surface Tension (mN · m$^{-1}$) | 40.67 | 41.06 | 40.86 | 40.68 |

*as % by weight based on total weight of ink

Print results summarized in Table 2B below show that catechol reduces bleed relative to the control. At the level of 8% catechol (Ink 2C), some loss of optical density was observed compared to the control (Ink 2D).

TABLE 2B

| Print Properties | Ink 2A | Ink 2B | Ink 2C | Ink 2D (control) |
|---|---|---|---|---|
| Optical Density | 1.52 | 1.50 | 1.43 | 1.52 |
| Bleed K/Y (μ) | 45.7 | 33.0 | 32.1 | 60.4 |
| Bleed K/R (μ) | 85.9 | 54.5 | 30.1 | 86.3 |

Example 3

In this example, Inks 3A and 3B were prepared using an SDP having indirectly bonded carboxylate surface groups (Cab-O-Jet™ 300, Cabot Corp., Billerica, Mass., U.S.A.) whereas Inks 3C and 3D were prepared using an SDP according to the present invention having directly bonded carboxylate surface groups (Dispersion 1). Unlike Dispersion 1, the Cab-O-Jet™ 300 black colorant is based on the Cabot grafting technology which bonds a carboxylate group to the carbon black pigment surface through another atomic group (phenylene). All ingredients for Inks 3A-3D are listed in Table 3A.

TABLE 3A

| | Ink 3A (Control) | Ink 3B (Comparative) | Ink 3C (Control) | Ink 3D |
|---|---|---|---|---|
| Ingredient | | | | |
| Cabojet* | 4 | 4 | — | — |
| Dispersion 1* | — | — | 4 | 4 |
| Glycerol* | 6.5 | 6.5 | 6.5 | 6.5 |
| 2-Pyrrolidone* | 5.9 | 5.9 | 5.9 | 5.9 |
| Diethyleneglycol* | 5.5 | 5.5 | 5.5 | 5.5 |
| Trimethylolpropane* | 2.0 | 2.0 | 2.0 | 2.0 |
| Catechol* | — | 6.0 | — | 6.0 |
| Surfynol 465* | 0.025 | 0.13 | 0.25 | 0.2 |
| Water Added | Balance to 100% | Balance to 100% | Balance to 100% | Balance to 100% |
| Physical Properties | | | | |
| Viscosity (mPa · s) | 2.14 | 2.37 | 2.42 | 2.58 |
| pH | 8.1 | 7.51 | 7.11 | 7.12 |
| Surface Tension (mN · m$^{-1}$) | 39.45 | 40.47 | 41.23 | 40.37 |

*as % by weight based on total weight of ink

Print results summarized in Table 3B below show that using the Cab-O-Jet SDP results in lower optical density than using Dispersion 1 (Ink 3A versus Ink 3C). Furthermore, the combination of catechol with the Cab-O-Jet SDP does not improve bleed (K/Y and K/R of Ink 3B are roughly the same as those of Ink 3A). This combination, however, reduces the optical density of the ink from 1.28 for Ink 3A to 1.16 for Ink 3B. The same level of catechol with Dispersion 1 shows substantial improvement in bleed relative to control (Ink 3D versus Ink 3C). Although a decrease in optical density (OD) is observed in Ink 3D, its OD is still much higher than the OD for Inks 3A-3B made with the Cab-O-Jet SDP.

TABLE 3B

| Print Properties | Ink 3A (Control) | Ink 3B (Comparative) | Ink 3C (Control) | Ink 3D |
|---|---|---|---|---|
| Optical Density | 1.28 | 1.16 | 1.52 | 1.41 |
| Bleed K/Y (μ) | 57.7 | 56.6 | 70.1 | 39.0 |
| Bleed K/R (μ) | 57.5 | 62.1 | 72.0 | 45.0 |

Example 4

Inks 4A-4C were prepared using Dispersion 1 and other ingredients according to Table 4A. Ink 4A contains 4% of 4-methylcatechol whereas Ink 4B contains 4% of catechol.

TABLE 4A

| | Ink 4A | Ink 4B | Ink 4C (Control) |
|---|---|---|---|
| Ingredient | | | |
| Dispersion 1* | 4 | 4 | 4 |
| 1,3-Propanediol* | 11 | 11 | 11 |
| Glycereth 26* | 3 | 3 | 4 |
| 4-Methylcatechol* | 4 | — | — |
| Catechol* | — | 4 | — |
| Surfynol 440* | 0.04 | 0.08 | 0.25 |
| Water Added | Balance to 100% | Balance to 100%. | Balance to 100% |
| Physical Properties | | | |
| Viscosity (mPa · s) | 2.46 | 2.41 | 2.51 |
| pH | 6.9 | 7.17 | 7.05 |
| Surface Tension (mN · m$^{-1}$) | 38.91 | 39.60 | 40.68 |

*as % by weight based on total weight of ink

Print results summarized in Table 4B show that 4-methylcatechol is able to substantially reduce bleed, although there appears to be some slight reduction in OD relative to control (Ink 4C) and the ink containing catechol (Ink 4B).

TABLE 4B

| Print Properties | Ink 4A | Ink 4B | Ink 4C (Control) |
|---|---|---|---|
| Optical Density | 1.43 | 1.47 | 1.50 |
| Bleed K/Y (μ) | 27.2 | 33.1 | 61.5 |
| Bleed K/R (μ) | 38.9 | 38.9 | 91.2 |

What is claimed is:

1. An inkjet ink comprising an aqueous vehicle, a self-dispersing pigment and a bleed control agent, wherein
said bleed control agent is selected from the group consisting of catechol, 4-methylcatechol and any combination thereof, and said self-dispersing pigment comprises carboxylate dispersibility-imparting groups directly bonded to the surface of the pigment.

2. The inkjet ink of claim 1, wherein the self-dispersing pigment comprises a self-dispersing carbon black pigment.

3. The inkjet ink of claim 2, wherein said self-dispersing pigment has a degree of functionalization of less than about 3 μmol/m$^2$.

4. The inkjet ink of claim 3, wherein the amount of the bleed control agent present is greater than 2% by weight based on total weight of an ink.

5. The inkjet ink of claim 1, wherein the bleed control agent is catechol.

6. The inkjet ink of claim 2, wherein the bleed control agent is catechol.

7. The inkjet ink of claim 3, wherein the bleed control agent is catechol.

8. The inkjet ink of claim 4, wherein the bleed control agent is catechol.

9. The inkjet ink of claim 1, wherein the bleed control agent is 4-methylcatechol.

10. The inkjet ink of claim 2, wherein the bleed control agent is 4-methylcatechol.

11. The inkjet ink of claim 3, wherein the bleed control agent is 4-methylcatechol.

12. The inkjet ink of claim 4, wherein the bleed control agent is 4-methylcatechol.

13. An inkjet ink set comprising at least a magenta, yellow, cyan and black ink, wherein the black ink comprises an aqueous vehicle, a self-dispersing carbon black pigment and a bleed control agent, and wherein said bleed control agent is selected from the group consisting of catechol, 4-methylcatechol and any combination thereof, and said self-dispersing carbon black pigment comprises carboxylate dispersibility-imparting groups directly bonded to the surface of the pigment.

14. The inkjet ink set of claim 13, wherein said magenta, said yellow and said cyan inks are dyes.

* * * * *